(12) United States Patent
Gessner et al.

(10) Patent No.: US 8,023,490 B2
(45) Date of Patent: Sep. 20, 2011

(54) METHOD FOR THE TRANSMISSION OF DATA PACKETS IN A RADIO COMMUNICATION SYSTEM BASED ON HIGH AND LOW PRIORITY

(75) Inventors: Christina Gessner, München (DE); Norbert Kroth, Potsdam (DE); Axel Meiling, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 491 days.

(21) Appl. No.: 10/487,691

(22) PCT Filed: Aug. 26, 2002

(86) PCT No.: PCT/DE02/03127
§ 371 (c)(1),
(2), (4) Date: Sep. 13, 2004

(87) PCT Pub. No.: WO03/019895
PCT Pub. Date: Mar. 6, 2003

(65) Prior Publication Data
US 2005/0018644 A1    Jan. 27, 2005

(30) Foreign Application Priority Data
Aug. 24, 2001 (DE) .................................. 101 41 512

(51) Int. Cl.
*H04J 3/24* (2006.01)

(52) U.S. Cl. ........ 370/349; 370/389; 370/473; 370/474; 370/328

(58) Field of Classification Search .................. 370/349, 370/230.1, 229, 231, 394, 328
See application file for complete search history.

(56) References Cited

U.S. PATENT DOCUMENTS

| | | | |
|---|---|---|---|
| 4,905,234 A | | 2/1990 | Childress et al. |
| 5,596,318 A | * | 1/1997 | Mitchell ...................... 340/7.22 |
| 5,734,867 A | | 3/1998 | Clanton et al. |
| 6,222,841 B1 | * | 4/2001 | Taniguchi .................... 370/389 |
| 6,396,814 B1 | * | 5/2002 | Iwamura et al. ............... 370/256 |
| 6,519,260 B1 | * | 2/2003 | Galyas et al. ............. 370/395.42 |
| 6,816,458 B1 | * | 11/2004 | Kroon ........................... 370/235 |

FOREIGN PATENT DOCUMENTS

| | | |
|---|---|---|
| EP | 1 193 938 | 4/2002 |
| WO | WO 00/20876 | 4/2000 |

* cited by examiner

*Primary Examiner* — Kamran Afshar
*Assistant Examiner* — Sayed T Zewari
(74) *Attorney, Agent, or Firm* — King & Spalding L.L.P.

(57) ABSTRACT

Disclosed is a method for the transmission of data packets in a radio communication system, wherein the transmission of data packets of a data flow having a first priority (Prio) with respect to the transmission of data packets is interrupted by that of a second priority (Prio) if the second priority (Prio) is higher than the first priority (Prio).

7 Claims, 2 Drawing Sheets

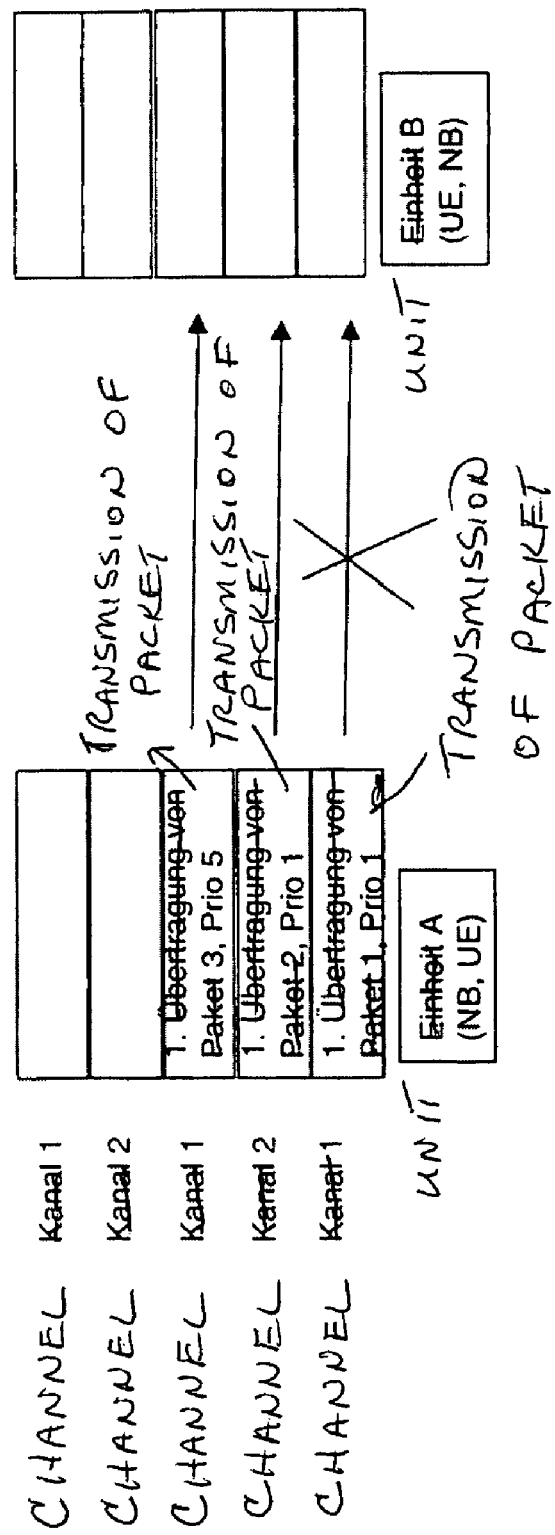

METHOD FOR THE TRANSMISSION OF DATA PACKETS IN A RADIO COMMUNICATION SYSTEM BASED ON HIGH AND LOW PRIORITY

The invention relates to a method and a radio station for transmitting data packets in a radio communication system, in particular in a mobile radio system.

In radio communication systems, information such as voice, image information or other data is transmitted with the aid of electromagnetic waves over a radio interface between a sending and a receiving radio station (base station and mobile station). Said electromagnetic waves are radiated at carrier frequencies that lie in the frequency band provided for the respective system. Frequencies in the frequency band of approximately 2000 MHz are provided for future mobile radio systems employing CDMA or TD/CDMA transmission methods over the radio interface, for example the UMTS (Universal Mobile Telecommunications System) or other 3rd-generation systems. Frequency Division Multiplex Access (FDMA), Time Division Multiplex Access (TDMA), or a method known as Code Division Multiplex Access (CDMA) here serve to distinguish the signal sources.

As part of the specification of the UMTS standard, methods are currently being defined which are to be optimized for packet transmissions. An example of this is the method known as High Speed Downlink Packet Access (HSDPA) for the FDD (Frequency Division Duplex) and TDD (Time Division Duplex) modes of the UMTS standard. These methods are intended to be capable of catering for services with different requirements in terms of quality of service (QoS). In this scheme a base station (NB—Node B) is responsible for what is termed scheduling of the data of different users, as well as for what are termed re-transmissions, i.e. repeat transmissions of incorrectly received data packets in what is referred to as a hybrid ARQ (HARQ) process. Hybrid ARQ methods derive their advantage from the fact that incorrectly received data packets are stored in a storage facility (buffer) in the receiver so that they can be combined with succeeding retransmissions and, where applicable, modified transmissions of the data packets. In contrast to known pure ARQ methods, in which bad data packets are discarded on the receive side, this can advantageously be used to benefit also from the data packets already received in order to increase the reception quality.

In order to implement an efficient time planning (scheduling) mechanism for the transmission of data packets of different services with, where applicable, different Quality-of-Service requirements, the assignment of resources to these possibly high data rate services as well as the control of the HARQ protocols are performed in the base station. Nonetheless, no complete information regarding, for example, incoming data for different users and their buffer status is available to the base station, since this information is available only in the higher-level so-called serving radio network controllers (SRNCs). Flow control mechanisms are used in order to ensure efficient transmission of the data of different users from possible different SRNCs to the base stations. Moreover, the data streams of a user and between users can differ in terms of the required quality of service in each case, i.e. transmission delay, data rate, acceptable error rate, etc.

Because of this complexity and the high requirements to be fulfilled owing to the flow control mechanism, further mechanisms must be available in the base station to guarantee an efficient scheduling process in order to meet the quality-of-service requirements of different data streams for different users. It is assumed that the quality-of-service handling of different data streams is based on priority values assigned by the flow control mechanism in the radio network controller (RNC). These priority values are derived from the quality-of-service parameters of the data streams. It is further assumed that the base station receives these priority values for each data stream from the radio network controller.

Consideration of the quality of the services in the scheduling process of the HSDPA has not yet been discussed to date in the course of the specification of the UMTS standard. Compared to the known methods in UMTS Release 99, in the HSDPA part of the resources are controlled by what are termed the controlling radio network controllers (CRNCs) and another part of the resources (for HSDPA) are controlled in the base stations. As a result, a base station cannot control all the resources in the served radio cell, but only the resources assigned to the HSDPA. Depending on the respective quality-of-service requirements, different HSDPA data must be handled differently by the HARQ mechanism. Moreover, scheduling in the base stations is a very dynamic process, and available buffer capacity in the base station must likewise be taken into account.

Owing to the fact described, namely that a base station potentially has to control and perform transmissions of data streams and/or data packets of different connections with different quality-of-service requirements to a user terminal, re-transmissions of data packets of one service for example can disadvantageously result in delays in the transmission of data packets of a further service. In these cases it may no longer be possible to meet the predefined quality of service of the further service, which can lead to unpleasant delays for the user on the receive side.

The object of the invention is to specify a method and a radio station which allow predefined quality-of-service requirements to be met during the transmission of packet data. This object is achieved by the features of the independent claims. Advantageous developments of the invention can be derived from the respective dependent claims.

The method according to the invention is described in more detail below with reference to exemplary embodiments and the drawings, in which:

FIG. 2 is a schematic representation of the procedural flows according to the invention in a sending and a receiving radio station.

Figure 1:
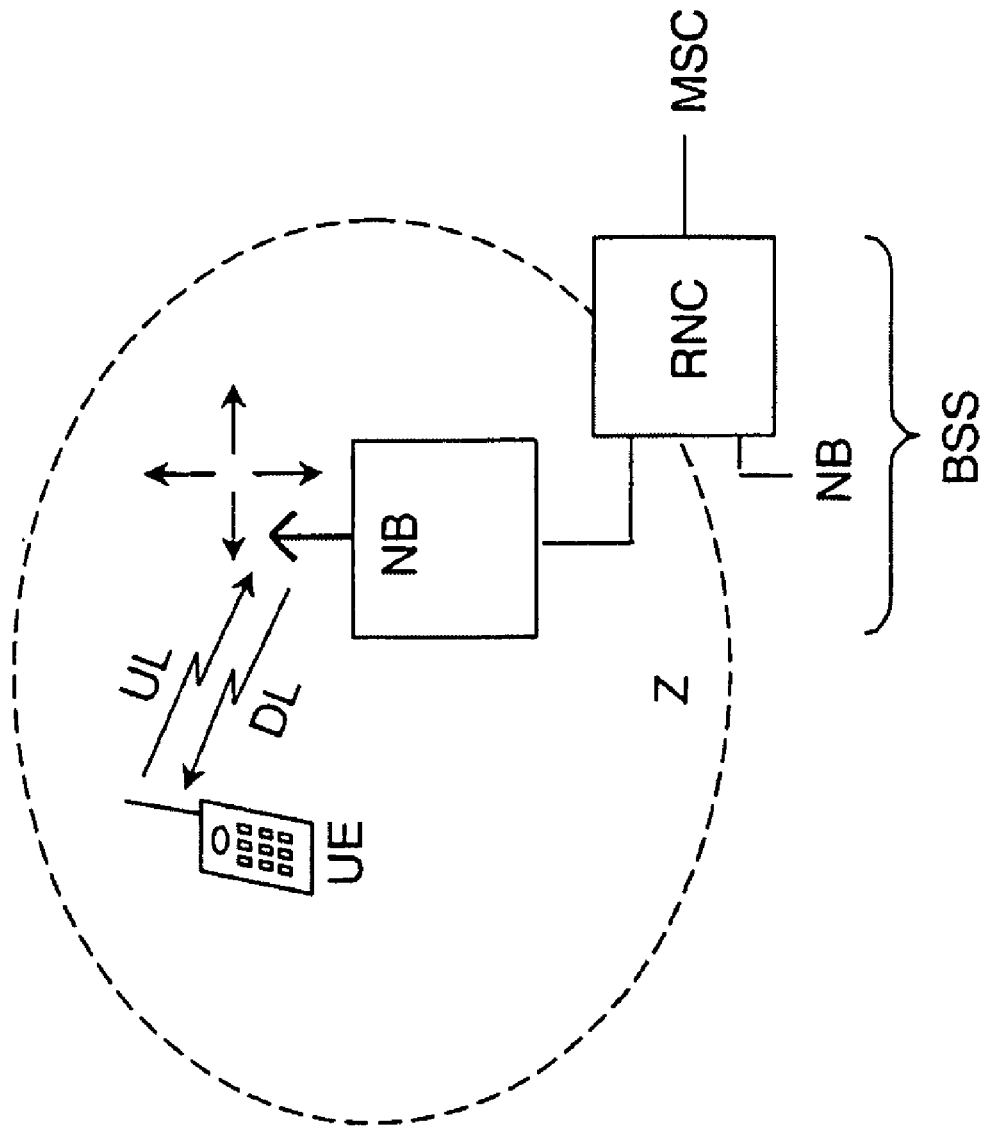
FIG. 1 is a block diagram of a radio communication system.

FIG. 1 shows an exemplary radio communication system having a plurality of switching facilities MSC (Mobile Switching Center) which are interconnected. At least one of said switching facilities MSC generally forms a point of access to further communication systems such as, for example, a fixed network communication system (PSTN—Public Switched Telephone Network). Base stations NB (Node B) are connected to the switching facilities MSC as send/receive facilities of the radio communication system. The base stations NB are linked via communication connections to terminals, specifically to user terminals UE (User Equipment), via a radio interface, it being possible for said terminals to be mobile or stationary terminals.

Between the base station NB shown in FIG. 1 and the user terminal UE in the radio coverage area of this base station NB there exists a unidirectional or bidirectional communication connection with an uplink UL from the user terminal UE to the base station NB and/or a downlink DL from the base station NB to the user terminal UE.

In order to meet quality-of-service requirements of different services whose data streams or data packets are transmitted between a sending and a receiving radio station via the radio interface, it is proposed according to the invention that the sending radio station can provoke a discarding of an ongoing HARQ transmission of a data stream with a specific priority in favor of a data stream with a higher priority. The receiving radio station either confirms or does not confirm the reception of the respective data packet independently of the current HARQ protocol. In the event that the receiving radio station has not received a data packet correctly, according to the HARQ protocol it sends a NACK (Not Acknowledging) message to the sending radio station and expects a retransmission of this specific data packet. If the receiving radio station subsequently does not receive this repeated version of the data packet, higher layers such as, for example, the RLC (Radio Link Control) layer above the HARQ protocol may again request the retransmission of the data packet or decide to resume processing without this data packet, for example in so-called streaming services such as video transmission.

For the receiving radio station there exist different means of determining that an expected retransmission of an incorrectly received data packet will not take place. An example of one option would be the definition of a timer, after the expiration of which succeeding correctly received data packets will be forwarded to higher processing layers. Furthermore, data packet sequence numbers, for example, or channel structures for so-called stop and wait schemes can be used, for example in the event that a new data packet or a first-time transmission of a data packet is received although the retransmission of the preceding data packet has not yet been completed.

In order to speed up this determination of a retransmission of a data packet that is not taking place, according to the invention it is signaled to the receiving radio station by means of quality-of-service and/or priority indicators of the data streams that, for example, an ongoing HARQ transmission with a specific priority has been terminated in favor of a data stream with a different, usually higher, priority. By this means the receiving radio station can also advantageously recognize the new data stream.

FIG. 2 shows an exemplary flow diagram of the method according to the invention for transmitting data between a sending and a receiving radio station. A sending radio station, in this example a base station NB or a user terminal UE designated as Unit A, sends, in a first channel Channel 1 of an HSDPA channel consisting of a plurality of logical or physical transmission channels, a first data packet Packet 1 having a first priority Prio 1 to a receiving radio station, in this example a user terminal UE or a base station NB designated as Unit B. A respective channel is assigned here to each data stream or service. Due to, for example, problems during the transmission of the first data packet Packet 1, said data packet is not received correctly by the receiving radio station Unit B and—not shown—is requested again from the sending radio station by means of a transmission of a NACK. Thereupon the sending radio station Unit A transmits a second data packet Packet 2 of a further service with an identical priority Prio 1 in a second channel Channel 2, said data packet being correctly received by the receiving radio station Unit B and acknowledged by the transmission—again not shown—of an ACK. The sending radio station Unit A then transmits in the first channel Channel 1 a third data packet of a service with a higher priority Prio 5 instead of a retransmission of the incorrectly received first data packet Packet 1. The receiving radio station Unit B can detect on the basis of the different priority of the third data packet Packet 3 and/or a quality-of-service indicator of the data stream that the first data packet Packet 1 requested for retransmission is not retransmitted by the sending radio station Unit A. It can, as described in the foregoing, possibly initiate a repeat request for the first data packet by means of signaling at higher protocol layers.

Each data packet to be transmitted is advantageously linked with a priority value Prio, whereby a higher priority value can signify a higher priority of the data stream. However, this does not necessarily have to mean higher quality-of-service requirements, though the priority values can also define different quality-of-service requirements. The sending radio station, for example the base station, can advantageously perform an autonomous assignment of the priority values, or alternatively retain the priority values received by the radio network controller RNC for each data stream. An algorithm can also be implemented in the sending radio station, said algorithm defining the priority values as a function of quality-of-service parameters.

Since both the sending and the receiving radio station possess knowledge about the transmission channel parameters, such as, for example, the transmission time interval, the coding rate, etc., this knowledge can additionally be used on the receiver side to recognize the decisions taken by the sending radio station, i.e. in FIG. 2 Unit B would recognize for example that the priority value Prio 5 is more important than the priority value Prio 1 on account of a more robust coding.

The method according to the invention advantageously supports efficient dynamic scheduling algorithms while at the same time fulfilling quality-of-service requirements. Furthermore, deficiencies in the flow control between the radio network controllers RNC and the base station can be overcome, since the base station possesses greater freedom to fulfill quality-of-service requirements independently of specifications by the radio network controller. Moreover, the receiving radio station is advantageously able to interpret all the decisions taken by the sending radio station, so misinterpretations in the HARQ protocol are avoided.

Generally, the method according to the invention advantageously opens up the possibility of supporting a dynamic mechanism for retransmission while at the same time fully supporting quality-of-service requirements. Priority values are evaluated in the HARQ protocol in order to "negotiate" the discarding of an ongoing HARQ packet transmission with a lower priority between the sending and the receiving radio station.

The invention claimed is:

1. A method for communicating data packets in a radio communication system, comprising:

receiving a first data packet at a second radio station via a radio interface, wherein the first data packet is part of a first data stream having a first priority, and wherein the first data stream is transmitted from a first radio station;

requesting a retransmission of the first data packet by the second radio station if the first data packet is not received correctly, after requesting retransmission of the first data packet, receiving at the second radio station a second data packet of a second, higher-priority data stream from the first radio station, wherein the second data packet is transmitted by the first radio station instead of the requested retransmission of the first data packet; and at some time after receiving the second data packet from the first radio station, the second radio station receiving the first data packet retransmitted by the first radio station;

wherein each of the first and second data packets is provided with a priority and/or quality-of-service indicator;

wherein the retransmission of an incorrectly received data packet is performed according to an ARQ-based process; and wherein the ARQ-based process is terminated upon expiration of a time interval.

2. The method according to claim 1, wherein the first and second priorities are defined as a function of a respective quality-of-service requirement.

3. The method according to claim 1, wherein the first and second priorities are defined independently of a respective quality-of-service requirement.

4. A system for communicating data packets in a radio communication system, comprising:
   a first radio station that transmits a first data stream over a radio interface having a first priority, said first data stream comprising a first data packet; and
   a second radio station that receives the first data packet from the first radio station and requests a retransmission of the first data packet if the first data packet is not received correctly;
   wherein after the request by the second radio station for retransmission of the first data packet, the first radio station interrupts the transmission of the first data stream in favor of a second, higher-priority data stream, and transmits a second data packet of the second, higher-priority data stream to the second radio station instead of transmitting the requested retransmission of the first data packet to the second radio station at that time;
   wherein the second radio station determines that the second data packet received from the first radio station has a different priority than the first data packet; and
   wherein the second radio station determines that the retransmission of the first data packet has been interrupted based on the determination that the priority of the second data packet is different than the priority of the first data packet; and
   wherein the first radio station transmits the requested retransmission of the first data packet to the second radio station at some time after transmitting the second data packet to the second radio station.

5. A method for communicating data packets in a radio communication system, comprising:
   receiving a first data packet at a second radio station via a radio interface, wherein the first data packet is part of a first data stream having a first priority, and wherein the first data stream is transmitted from a first radio station;
   requesting a retransmission of the first data packet by the second radio station if the data packet is not received correctly;
   after requesting retransmission of the first data packet, receiving at the second radio station a second data packet of a second, higher-priority data stream from the first radio station, wherein the second data packet is transmitted by the first radio station instead of the requested retransmission of the first data packet;
   determining at the second radio station that the second data packet received from the first radio station has a different priority than the first data packet; and
   determining that the retransmission of the first data packet has been interrupted based on the determination that the priority of the second data packet is different than the priority of the first data packet.

6. A method for communicating data packets in a radio communication system, comprising:
   transmitting a first data packet from a first radio station to a second radio station via a radio interface, wherein the first data packet is part of a first data stream having a first priority, and wherein the first data stream is transmitted from a first radio station;
   the second radio station requesting a retransmission of the the first data packet is not received correctly at the second radio station; and
   after the request by the second radio station for retransmission of the first data packet, the first radio station interrupting the transmission of the first data stream in favor of a second, higher-priority data stream, and transmitting to the second radio station a second data packet of a second, higher-priority data stream instead of the retransmitting the first data packet, such that the requested retransmission of the first data packet is at least temporarily delayed by the first radio station in order to transmit the second data packet of the second, higher-priority data stream.

7. A system for communicating data packets in a radio communication system, comprising:
   a first radio station configured to transmit a first data packet to a second radio station via a radio interface, wherein the first data packet is part of a first data stream having a first priority, and wherein the first data stream is transmitted from a first radio station;
   the second radio station configured to request a retransmission of the first data packet from the first radio station if the first data packet is not received correctly at the second radio station; and
   the first radio station further configured to, after receiving the request by the second radio station for retransmission of the first data packet, interrupt the transmission of the first data stream in favor of a second, higher-priority data stream, and transmit to the second radio station a second data packet of a second, higher-priority data stream instead of the retransmitting the first data packet, such that the first radio station at least temporarily delays the requested retransmission of the first data packet to the second radio station in order to transmit the second data packet of the second, higher-priority data stream to the second radio station.

* * * * *